(12) United States Patent
Koch et al.

(10) Patent No.: US 8,513,333 B2
(45) Date of Patent: Aug. 20, 2013

(54) REACTIVE SURFACE-MODIFIED PARTICLES

(75) Inventors: Matthias Koch, Wiesbaden (DE); Jens Pradella, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 340 days.

(21) Appl. No.: 12/989,227

(22) PCT Filed: Apr. 8, 2009

(86) PCT No.: PCT/EP2009/002594
§ 371 (c)(1),
(2), (4) Date: Oct. 22, 2010

(87) PCT Pub. No.: WO2009/129932
PCT Pub. Date: Oct. 29, 2009

(65) Prior Publication Data
US 2011/0039990 A1    Feb. 17, 2011

(30) Foreign Application Priority Data
Apr. 23, 2008 (DE) .......................... 10 2008 020 440

(51) Int. Cl.
*C08K 9/06* (2006.01)
*C08K 5/24* (2006.01)
*C04B 14/04* (2006.01)

(52) U.S. Cl.
USPC ............ 523/213; 524/262; 524/431; 106/490

(58) Field of Classification Search
USPC .................. 523/213; 524/262, 431, 98, 790; 106/287.11, 490
See application file for complete search history.

(56) References Cited

U.S. PATENT DOCUMENTS

| | | | |
|---|---|---|---|
| 5,998,504 A * | 12/1999 | Groth et al. | 523/213 |
| 2003/0013369 A1 | 1/2003 | Soane et al. | |
| 2003/0203991 A1* | 10/2003 | Schottman et al. | 523/334 |
| 2006/0111500 A1* | 5/2006 | Harada et al. | 524/210 |
| 2010/0215959 A1 | 8/2010 | Jonschker et al. | |

FOREIGN PATENT DOCUMENTS

| | | |
|---|---|---|
| DE | 19715426 A1 | 10/1998 |
| DE | 102005056620 A1 | 6/2007 |
| EP | 2058349 A1 | 11/2007 |
| WO | 2007059841 A1 | 5/2007 |
| WO | 2007059842 A1 | 5/2007 |
| WO | 2008101581 A1 | 8/2008 |

OTHER PUBLICATIONS

World IP Organization. "International Search Report." PCT/EP2009/002594. Examiner: Koen Bergmans, Applicant: Merck Patent GmbH, Mailed Jul. 9, 2009.

* cited by examiner

*Primary Examiner* — Hannah Pak
(74) *Attorney, Agent, or Firm* — Millen, White, Zelano & Branigan, P.C.

(57) ABSTRACT

The invention relates to particles which have been functionalised by means of an inertised reactive group, i.e. by means of specific reversibly blocked isocyanate groups, and whose inertization can be reversed by means of an external influence.

18 Claims, No Drawings

REACTIVE SURFACE-MODIFIED PARTICLES

The invention relates to particles which have been functionalised by means of an inertised reactive group, i.e. by means of specific reversibly blocked isocyanate groups, and whose inertisation can be reversed by means of an external influence.

Polymeric coatings in the form of surface coatings and plastic layers are used for the protection of surfaces against corrosion, in order to reduce wear and in order to prevent seizure in the case of rubbing partners with high tribological loads. Depending on the application, these coatings comprise friction-reducing additives. The service life of coatings of this type is limited by abrasion of the layer in the case of tribological load.

European Patent EP-B-0 124 955 discloses the use of mixtures of polyolefins with polytetrafluoroethylene for controlling the friction and wear properties of a polymeric matrix. The coefficient of friction of the polymer matrix is reduced by the additive. However, it has been found that the strength and hardness and thus the durability of such polytetrafluoroethylene composites under load are significantly worse than those of the unfilled materials.

DE 101 60 329 describes the reinforcement of polyolefins by means of silica particles. The latter are bonded into the polymer matrix via loops and can be torn out of the matrix composite by shear loads.

DE 10 2004 033 968 describes the admixing of hard particulate, in particular nanoparticulate, materials with polybenzophenylene and similar compounds in order to improve the abrasion resistance. In certain areas of application (for example in the case of high surface pressures), however, the particles may break out of the matrix, resulting in increased wear compared with unfilled materials.

It has been found that covalent bonding of the reinforcing particles into the matrix is necessary in systems subjected to tribological loads. The strength of the composite material and the abrasion-reducing action of the particles can thereby be increased further.

The object of the present invention is therefore to provide agglomerate-free, surface-functionalised particles which undergo covalent bonding when mixed homogeneously into a polymer matrix.

The object is achieved by metal-oxide particles containing specific reversibly blocked isocyanate groups.

The invention therefore relates firstly to metal-oxide particles containing reversibly blocked isocyanate groups in dispersion, obtainable by reaction of a dispersion of the metal-oxide particles with silanes of the formula

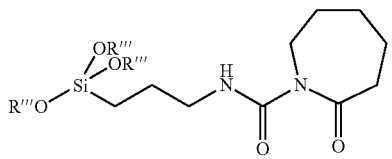

where
R''' in each case, independently of one another, denotes a linear or branched alkyl group having 1-8 C atoms,
Similar silanes as surface modifiers are known from EP 0872500.

The particles of the present invention have an average particle diameter (d50) of up to 500 nm, preferably 1 to 200 nm, particularly preferably 1 to 80 nm.

The reversible blocking of the metal-oxide particles is essential in order to ensure storage stability and processability in the desired polymer matrix, i.e. in the polymers or binders of surface coatings. The blocking is reversed in accordance with the invention by means of an external influence, preferably heat or radiation, after application of the polymer matrix or of the entire surface-coating composition which comprises the reversibly blocked metal-oxide particles. This allows reaction of the particles with the polymer of the matrix or the binder of the surface-coating system, producing a network with covalent chemical bonds.

In addition to the silanes of the formula

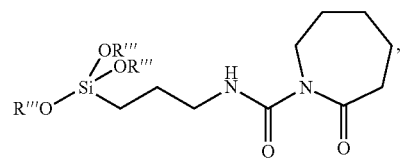

amphiphilic silanes are preferably used for the surface functionalisation, as described below.

Preference is furthermore given to a process for the production of metal-oxide particles containing reversibly blocked isocyanate groups in dispersion, by reaction of a dispersion of the metal-oxide particles with silanes of the formula

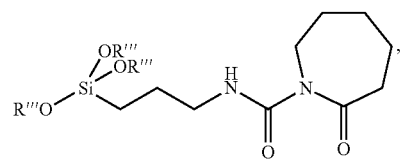

where
R''' in each case, independently of one another, denotes a linear or branched alkyl group having 1-8 C atoms.

A linear or branched alkyl group having 1 to 8 C atoms is, for example, methyl, ethyl, isopropyl, tert-butyl, n-butyl, n-pentyl, n-hexyl, n-heptyl, n-octyl or ethylhexyl. R''' is particularly preferably methyl or ethyl.

An alcoholic or aqueous dispersion of the metal-oxide particles is preferably employed in the process according to the invention. Particular preference is given to an alcoholic dispersion, which may optionally also comprise water. Preferred alcohols are methanol, ethanol, propanol, isopropanol or n-butanol. Ethanol is particularly preferably used.

In general, dispersions of the metal-oxide particles containing reversibly blocked isocyanate groups are formed by the process described above. For incorporation into particular surface-coating systems or polymer matrix thereof, it may be essential to use isolated nanoparticles.

Isolated metal-oxide particles containing reversibly blocked isocyanate groups can be obtained if the solvent is removed for drying in the process according to the invention, as described above or defined in the claims.

The invention therefore also relates to isolated metal-oxide particles containing reversibly blocked isocyanate groups, as described above, characterised in that they are obtainable by the reaction indicated above, where, in a final step, the solvent is removed from the dispersion for drying.

Exchange of the solvent of the dispersion comprising the metal-oxide particles according to the invention is likewise possible. The procedure in this respect is known to the person skilled in the art. One possibility is described in Example 4a below, where, in Example 4a, the solvent of the dispersion of Example 3 is exchanged for N-methylpyrrolidone (NMP). This possibility enables the preparation of a dispersion in any desired solvent which is necessary or suitable for the desired application system or surface-coating system.

Typical surface-coating solvents are, for example, alcohols, such as methanol or ethanol, ethers, such as diethyl ether, tetrahydrofuran and/or dioxane, esters, such as butyl acetate, or hydrocarbons, such as toluene, petroleum ether, halogenated hydrocarbons, such as dichloromethane, or also commercially available products, such as solvent naphtha or products based on Shellsol, a high-boiling hydrocarbon solvent, for example Shellsol A, Shellsol T, Shellsol D40 or Shellsol D70. For certain surface-coating systems, typical solvents are dimethylformamide (DMF) and/or alkylpyrrolidones, for example N-methylpyrrolidone (NMP).

Advantages of the surface-modified metal-oxide particles according to the invention are
a) the particles can be distributed homogeneously and in an agglomerate-free manner in the polymer matrix, i.e. in a polymer or synonymously in a surface-coating binder,
b) the particles are suitable for storage, since, in the stored state, the reactive isocyanate group is in reversibly blocked form and can be activated if desired during processing by means of an external influence,
c) the particles significantly increase the abrasion resistance of surface coatings,
d) the particles improve the mechanical properties of thermally curing resins, so-called thermosets, preferably epoxy resins.

In particular compared with metal-oxide particles which have been functionalised for surface modification with the silanes known from EP 0872500, the metal-oxide particles according to the invention have the particular advantage of being suitable for incorporation into systems to be subjected to particular thermal stresses. The reversibly blocked isocyanate group used in accordance with the invention is stable at temperatures of 20 to 180° C. and can be reversibly deblocked from temperatures of 180° C. The relatively high deblocking temperature gives rise to processing advantages, in particular in the synthesis of the particles. Thus, there is less risk of undesired premature deblocking during removal of the solvents by distillation. The preferred range for thermal curing or deblocking is between 190° C. and 240° C.

For the purposes of the present invention, the term polymer matrix is defined as a polymeric compound or a mixture of polymeric compounds which contains reactive groups which are able to react with isocyanates. Suitable polymeric compounds therefore carry, for example, the reactive groups selected from —OH, —NHR (where R=organic radical or H). The polymeric compounds are therefore preferably polyester polyols, polyacrylate polyols, polyamides, polyamide-imides or epoxy resins. Polyamides, polyamide-imides or epoxy resins are particularly preferably selected as polymer matrix.

The polymeric compounds described as preferred or particularly preferred are, for example, known surface-coating binders.

Organic radicals R are, for example, linear or branched alkyl groups having 1 to 20 C atoms, cycloalkyl groups having 3 to 10 C atoms or aryl groups.

Preferred linear or branched alkyl groups are, for example, methyl, ethyl, n-propyl, isopropyl, n-butyl, isobutyl, tert-butyl, n-pentyl or n-hexyl.

Preferred cycloalkyl groups are, for example, cyclopropyl, cyclobutyl, cyclopentyl or cyclohexyl. Aryl groups are preferably phenyl or naphthyl.

The particle material is particularly preferably based on oxides or hydroxides of silicon, titanium, zinc, aluminium, cerium, cobalt, chromium, nickel, iron, yttrium and/or zirconium, which may optionally be coated with oxides or hydroxides of silicon or aluminium. The metal-oxide particles according to the invention therefore preferably consist of oxides or hydroxides of silicon, titanium, zinc, aluminium, cerium, cobalt, chromium, nickel, iron, yttrium and/or zirconium, which may optionally be coated with oxides or hydroxides of silicon. Particularly preferred metal-oxide particles are indicated below.

In the metal-oxide particles according to the invention, metal denotes all elements which can occur as electropositive partner compared with the counterions, such as the classical metals from the sub-groups or the main-group metals from the first and second main groups, but also all elements from the third main group, as well as silicon, germanium, tin, lead, phosphorus, arsenic, antimony and bismuth. The preferred metal oxides include, in particular, titanium dioxide, zinc dioxide, zirconium dioxide, cerium dioxide and silicon dioxide. The metal-oxide particles used are very particularly preferably silicon dioxide particles.

The metal-oxide particles are usually admixed with the polymer matrix, as defined above, in ranges from 0.1-25% by weight, in particular 0.5-15% by weight and particularly preferably 1-5% by weight, based on the total solids content of the polymer matrix.

For use of the metal-oxide particles in the sense of the present invention, it has proven advantageous, in particular with respect to the abrasion properties, for the particles to be round and to have no edges; i.e. for the purposes of the present invention, for the ratios of the three mutually perpendicular average diameters of the particles to be in the range from 1:2 to 2:1 and preferably in the range 1.5:1-1:1.5.

The diameter and shape are determined by means of electron photomicrographs (SEM, TEM).

It is furthermore advantageous for the particles to be non-porous; i.e. the surface of the particles is essentially formed by the outer surface thereof.

In addition, it is advantageous in the sense of the abrasion properties and processability for the metal-oxide particles to have a particle-size distribution in which the proportions of particles having an average particle diameter above 500 nm are less than 0.5% by weight, where the proportions of particles having an average particle diameter above 200 nm are preferably less than 0.5% by weight and the proportions of particles having a particle diameter above 80 nm are particularly preferably less than 0.5% by weight. The average particle diameter is determined by means of particle'correlation spectroscopy (PCS) or by means of a transmission electron microscope.

In the PCS method, the investigation is carried out using a Malvern Zetasizer in accordance with the operating manual. The diameter of the particles is determined here as the d50 value. The term "average particle diameter" in the present description refers to this d50 value.

In a variant of the present invention, the metal-oxide particles employed are preferably monodisperse cores comprising silicon dioxide, which can be obtained, for example, by the process described in U.S. Pat. No. 4,911,903. The cores are produced here by hydrolytic polycondensation of tetraalkoxysilanes in an aqueous/ammoniacal medium, where firstly a sol of primary particles is produced, and the resultant $SiO_2$ particles are subsequently brought to the desired particle size by continuous, controlled metered addition of tetraalkoxysilane. This process enables the production of monodisperse $SiO_2$ cores having a standard deviation of the average particle diameters of 5%.

Furthermore, the starting material is preferably $SiO_2$ cores which have been coated with semimetals, metals or metal oxides, such as, for example, $TiO_2$, $ZrO_2$, $ZnO_2$, $SnO_2$ or $Al_2O_3$. The production of $SiO_2$ cores coated with metal oxides is described in greater detail, for example, in U.S. Pat. No. 5,846,310, DE 198 42 134 and DE 199 29 109.

The starting material employed can also be monodisperse cores comprising metal oxides, such as $TiO_2$, $ZrO_2$, $ZnO_2$, $SnO_2$ or $Al_2O_3$, or metal-oxide mixtures. Their production is described, for example, in EP 0 644 914, Furthermore, the process in accordance with EP 0 21.6 278 for the production of monodisperse $SiO_2$ cores can readily be applied with the same result to other oxides. Tetraethoxysilane, tetrabutoxytitanium, tetrapropoxyzirconium or mixtures thereof are added in one portion with vigorous mixing to a mixture of alcohol, water and ammonia, whose temperature is set precisely to 30 to 40° C. using a thermostat, and the resultant mixture is stirred vigorously for a further 20 seconds, with formation of a suspension of monodisperse cores in the nanometre range. After a post-reaction time of 1 to 2 hours, the cores are separated off in a conventional manner, for example by centrifugation, washed and dried.

The degree of surface functionalisation with silanes of the formula

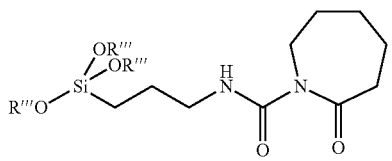

is 0.1 to 3 molecules/nm², preferably 0.2 to 2 molecules/nm².

The additional surface functionalisation besides the functionalisation with reversibly blocked isocyanate groups, as described above, is 1-80%, preferably 1-50%, particularly preferably 2-20%, of amphiphilic silanes, as described in WO 2007/059842. This prevents agglomeration of the particles during the functionalisation process, processing thereof and during application of the layer.

These silanes are preferably compounds of the general formula

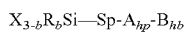

where
X denotes an organic group which can be cleaved off, preferably an alkoxy radical OR''' containing a linear or branched alkyl group R''' having 1-8 C atoms,
Sp denotes either O or straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms,
$A_{hp}$ denotes a hydrophilic block and
$B_{hb}$ denotes a hydrophobic block
and
where at least one reactive functional group is bonded to $A_{hp}$ and/or $B_{hb}$.

Preferred silanes for the additional surface functionalisation are described in WO 2007/059842, preferably silanes having the structures

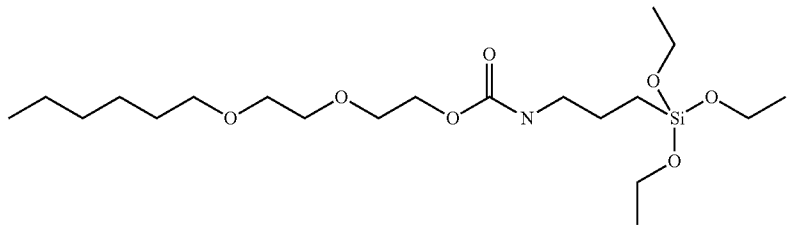 [SMILES: CCCCCCOCCOCCOC(=O)NCCC[Si](OCC)(OCC)OCC]

(2-(2-hexyloxyethoxy)ethyl 3-triethoxysilylpropylcarbamate),

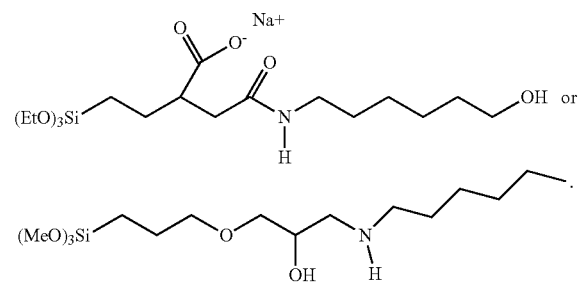

Furthermore, additional surface-functionalisation agents which can be employed are the commercially available silanes Dynasylan® Glymo (3-glycidyloxypropyltrimethoxysilane, Evonik) and Geniosil® GF20 (triethoxysilylpropylsuccinic anhydride, Wacker, Germany).

Preference is also given to the use of the particles according to the invention described above in a polymer matrix or in other words in a surface coating or resin.

Resin denotes thermosetting polymers.

The polymer matrix is preferably a constituent of a surface-coating formulation. The particles according to the invention are particularly preferably suitable for thermally curing surface coatings based on the polymer polyamide-imide (PAI).

PAIs contain both amide and imide functions in the polymer chain. They are typically formed from aromatic diamines, preferably 4,4'-diaminodiphenylmethane and trimellitic anhydride (DE10303635A1). The structure of PAIs and embodiments are well known to the person skilled in the art, for example from James M. Margolis, Editor in Chief, Engineering Plastics Handbook, ISBN 0071457674, McGraw-Hill, 2006.

The polymer of the polymer matrix, as described above, is preferably a polyamide, a polyamide-imide or an epoxide.

The polymer matrix furthermore preferably additionally comprises solid lubricants.

The particles can be used, in particular, in solvent-based surface coatings, aqueous binder dispersions (water-borne surface coatings), water-thinnable surface coatings or powder coatings, where the said surface coatings comprise the polymeric compounds as described above as matrix.

As stated above, composite materials are suitable, i.e. compositions comprising the metal-oxide particles according to the invention and at least one polymeric compound as matrix, as defined above, as materials and coatings for use in sliding pairs, in particular ball bearings, roller bearings, sliding bearings, link chains and gearbox gearwheels, and corresponding products.

The invention therefore furthermore relates to a composition comprising the metal-oxide particles according to the invention, as described above, and at least one polymeric compound as matrix, as described above or as described as preferred.

The composition may preferably additionally comprise solid lubricants.

The composite materials are particularly suitable for sliding pairs in which at least one sliding partner, preferably both sliding pairs, consists of metallic, polymeric and/or ceramic materials, where at least one of the sliding partners has a coating comprising the composite material.

Sliding pairs for technical use may adopt any known design here. The following may preferably be mentioned here:
sliding bearings,
roller bearings,
ball bearings, where the collar may particularly preferably consist of the polymer-based material,
link chains and
gearbox gearwheels.

The wear between the sliding partners can be achieved through the simultaneous se of the particles according to the invention and suitable solid lubricants. The use of solid lubricants is prior art; the choice can be made by the person skilled in the art in accordance with the application boundary conditions.

Accordingly, the invention also relates to the use of the particles according to the invention in sliding pairs.

At least one of the surfaces of the sliding pairs is preferably metallic.

The following examples are intended to explain the present invention in greater detail without restricting it.

EXAMPLES

Particle Correlation Spectroscopy

The measurements are carried out using a Malvern Zetasizer Nano ZS at room temperature and at a laser wavelength of 532 nm.

The sample volume is in all cases 1 ml at a concentration of 0.5 percent by weight of metal-oxide particles in butyl acetate. The solutions are filtered using a 0.45 µm filter before the measurement.

Transmission Electron Microscopy

A Fei Company Tecnai 20F with field-emission cathode is used. The photomicrographs are recorded at an acceleration voltage of 200 kV. Data acquisition by a Gatan 2k CCD camera.

Preparation of the liquid samples comprising metal-oxide particles for measurement in a transmission electron microscope:

For the sample preparation, the solution comprising the metal-oxide particles is diluted to 1% by weight, and one drop of this solution is placed on a carbon-coated Cu mesh, and the excess solution is immediately blotted off using a filter paper. The sample is measured after drying at room temperature for one day.

Example 1

Preparation of the Amphiphilic Silane as Surface Modifier I 4.00 ml of diethylene glycol mono-n-hexyl ether and 4.90 ml of 3-isocyanatopropyltriethoxysilane are combined in 6.00 ml of dried toluene under an inert-gas atmosphere, and the mixture is heated at 90° C. for 7 h. The course of the reaction is followed by IR spectroscopy. After completion of the reaction, the toluene is removed in a rotary evaporator. 2-(2-hexyloxyethoxy)ethyl (3-triethoxysilyl)propylcarbamate.

Example 2

Preparation of Surface Modifier II

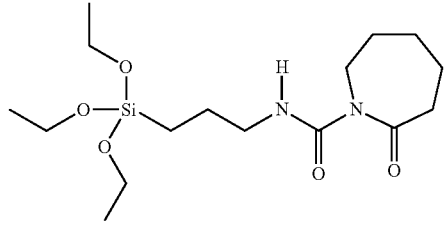 [SMILES: CCO[Si](CCCNC(=O)N1CCCCCC1=O)(OCC)OCC]

28.29 g of epsilon-caprolactam and 61.84 g of 3-isocyanatopropyltriethoxysilane are combined in 113.00 ml of dried toluene under an inert-gas atmosphere, and the mixture is heated at 90° C. for 20 h. The course of the reaction is followed by IR spectroscopy. After completion of the reaction, the toluene is removed in a rotary evaporator, giving surface modifier II=epsilon-caprolactam carboxy(3-triethoxysilyl)propylamide.

Example 3

Preparation of the Particle Dispersion Having an Average Particle Diameter of 20 nm 1200 ml of ethanol, 612 ml of water and 167 ml of TEOS (tetraethoxysilane) are initially introduced and adjusted to a temperature of 75° C. 36 ml of aqueous ammonia solution (concentration 25%) are added rapidly with vigorous stirring. The mixture is stirred vigorously for 30 s and then held at 75° C. for 1 h without further stirring. The mixture is then allowed to cool slowly to room temperature. For work-up, the entire mixture is evaporated to a weight of 510 g in a rotary evaporator, giving a 10% dispersion of silica particles having an average particle diameter of 20 nm.

Example 4a

Production of Functionalised Particles Containing Reversibly Blocked Reactive Groups 1 g of the silane from Example 1 and 4 g of the silane from Example 2 are added to 200 g of the 10% particle dispersion from Example 3. The mixture is stirred at room temperature for 24 h. 80 g of 1-methyl-2-pyrrolidone (NMP) are subsequently added. The water is removed in a rotary evaporator at 30° C., giving a homogeneous dispersion of the particles in NMP.

Comparative Example 4b

Production of functionalised particles containing no reactive groups in accordance with Example 4a, using 5 g of the silane from Example 1.

Comparative Example 4c 80 g of 1-methyl-2-pyrrolidone are added to 200 g of the 10% particle dispersion from Example 3, and the water is removed in a rotary evaporator under reduced pressure and at 30° C. The initially clear dispersion obtained becomes cloudy in the course of 8 days. After 12 days, a sediment comprising agglomerated silica particles has formed. This dispersion cannot be used for surface-coating formulations.

Example 5a

Surface-Coating Formulation Comprising Nanoparticles Containing Reversibly Blocked Reactive Groups and Application 28.5 g of the particle dispersion in NMP from Example 4a are added to 100 g of Molykote® 7409 from Dow-Corning. The mixture obtained is sprayed onto phosphated steel bodies (100Cr6) and baked at 150° C. for 120 min, then at 220° C. for 30 min.

Comparative Example 5b

Surface-Coating Formulation Comprising Nanoparticles Containing No Blocked Reactive Groups and Application 28.5 g of the particle dispersion in NMP from Example 4b are incorporated analogously to Example 5a, and the surface coating is applied by spraying.

Comparative Example 6

Surface Coating Comprising No Nanoparticles 22.8 g of 1-methyl-2-pyrrolidone are added to 100 g of Molykote® 7409 from Dow-Corning. The resultant mixture is sprayed onto phosphated steel bodies (100Cr6) and baked at 150° C. for 120 min, then at 220° C. for 30 min.

Testing:

The steel bodies from Examples 5a, 5b and 6 are subjected to a wear test in accordance with DIN 51834-8 (line contact, perpendicular force 20 N).

Results:

| Sample | Example 5a | Example 5b | Example 6 |
|---|---|---|---|
| Wear depth [µm] removed by abrasion | 2.2 | Termination after 18 min since layer removed by abrasion | 6.9 |

The test specimen from Example 5a exhibits 68% less wear here compared with Comparative Example 6. This results in a correspondingly longer service life of the coating.

Example 5b confirms that the particles containing no reversibly blocked isocyanate groups are not bonded into the matrix of the surface-coating system and therefore have an abrasive action, and the surface coating is resistant for a shorter time than without particles.

The invention claimed is:

1. Metal-oxide particles containing reversibly blocked isocyanate groups in dispersion, obtained by reaction of the dispersion of the metal-oxide particles with silanes of the formula

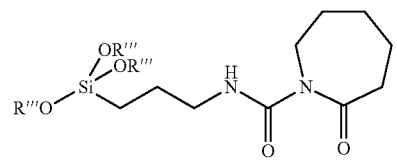

where
R''' in each case, independently of one another, denotes a linear or branched alkyl group having 1-8 C atoms.

2. The particles according to claim 1, wherein the metal-oxide particles comprise oxides or hydroxides of silicon, titanium, zinc, aluminum, cerium, cobalt, chromium, nickel, iron, yttrium, zirconium, and combinations thereof, and may optionally be coated with oxide or hydroxides of silicon or aluminum.

3. The particles according to claim 1, wherein in addition to the silanes of claim 1, amphiphilic silanes are used for surface functionalization.

4. Isolated particles obtained by drying the dispersion of claim 1.

5. A process for the production of metal-oxide particles containing reversibly blocked isocyanate groups in dispersion according to claim 1, comprising reacting a dispersion of the metal-oxide particles with
silanes of the formula

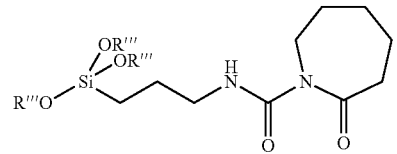

where
R''' in each case, independently of one another, denotes a linear or branched alkyl group having 1-8 C atoms.

6. The process for the production of metal-oxide particles according to claim 5, wherein said dispersion of the metal oxide particles is an alcoholic or aqueous dispersion.

7. The process for the production of metal oxide particles, according to claim 5, further comprising reacting with an amphiphilic silane.

8. The process for the production of metal oxide particles according to claim 5, further comprising drying the dispersion.

9. A composition comprising the metal oxide particles according to claim 1 and at least one polymeric compound as a matrix.

10. The composition according to claim 9, wherein the polymeric compound of the matrix is a polyamide, a polyamide-imide or an epoxide.

11. The composition according to claim 9, additionally comprising solid lubricants.

12. In a surface coating or resin comprising silane modified metal oxide particles according to claim 1.

13. Sliding pairs coated with the composition according to claim 10.

14. The sliding pairs according to claim 13, wherein at least one surface of the sliding pairs is metallic.

15. The sliding pairs according to claim 13 in the form of sliding bearings, roller bearings, ball bearings, link chains or gearbox gearwheels.

16. A surface coating, resin or sliding pair comprising the metal oxide particles according to claim 1.

17. Metal oxide particles having reversibly blocked isocyanate groups, said particles modified with a silane of the formula

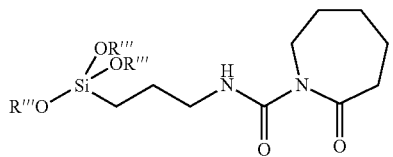

where
R''' in each case, independently of one another, denotes a linear or branched alkyl group having 1-8 C atoms.

18. The metal oxide particles according to claim 17, wherein the metal oxide particles are in an alcoholic or aqueous dispersion.

* * * * *